(12) United States Patent
Bui

(10) Patent No.: US 7,787,535 B2
(45) Date of Patent: Aug. 31, 2010

(54) METHOD FOR CALCULATING FILTER COEFFICIENTS FOR AN EQUALISER IN A COMMUNICATION RECEIVER USING HERMITIAN OPTIMISATION

(75) Inventor: Thanh Ngoc Bui, Victoria (AU)

(73) Assignee: NEC Corporation, Tokyo (JP)

( * ) Notice: Subject to any disclaimer, the term of this patent is extended or adjusted under 35 U.S.C. 154(b) by 846 days.

(21) Appl. No.: 11/632,562

(22) PCT Filed: Aug. 12, 2005

(86) PCT No.: PCT/JP2005/015100

§ 371 (c)(1),
(2), (4) Date: Jan. 16, 2007

(87) PCT Pub. No.: WO2006/016722

PCT Pub. Date: Feb. 16, 2006

(65) Prior Publication Data

US 2009/0185611 A1    Jul. 23, 2009

(30) Foreign Application Priority Data

Aug. 12, 2004  (AU) .............................. 2004904575
Jul. 26, 2005  (AU) .............................. 2005203278

(51) Int. Cl.
H03K 5/159    (2006.01)
(52) U.S. Cl. ..................................................... 375/232
(58) Field of Classification Search ................ 375/232, 375/147, 320, 229; 708/323; 455/41.2, 434
See application file for complete search history.

(56) References Cited

U.S. PATENT DOCUMENTS 3,974,449 A    8/1976    Falconer
5,068,873 A    11/1991   Murakami
5,283,811 A    2/1994    Chennakeshu et al.

(Continued)

FOREIGN PATENT DOCUMENTS

WO    WO 01/71996 A2    9/2001

OTHER PUBLICATIONS

Karimi H R et al: "A novel and efficient solution to block-based joint-detection using approximate Cholesky factorization" Personal, Indoor and Moblie Radio Communications, 1998. The Ninth IEEE International Syposium on Boston, MA, USA Sep. 8-11, 1998, New York, NY, USA, IEEE, US, vol. 3, Sep. 8, 1998, pp. 1340-1345, XP010314638.

Primary Examiner—Khai Tran
(74) Attorney, Agent, or Firm—Scully, Scott, Murphy & Presser, P.C.

(57)    ABSTRACT

A method for calculating filter coefficients for an equalizer in a communication receiver, the method including the steps of calculating (22) channel response matrices G and H from channel estimation inputs; performing (24) a Cholesky decomposition of the channel response matrix G into a lower triangular matrix L and an upper triangular matrix U; performing (26) forward substitution on the lower triangular matrix L to calculate a column vector d; performing (28) backward substitution on the column vector d and the Hermitian transpose $L^H$ of the lower triangular matrix L to calculate a middle column $c_0$ of the inverse $G^{-1}$ of the channel response matrix G; and calculating (30) the filter coefficients from the middle column $c_0$ of the inverse channel response matrix $G^{-1}$ and the Hermitian transpose $H^H$ of the response matrix H.

7 Claims, 3 Drawing Sheets

U.S. PATENT DOCUMENTS

| | | |
|---|---|---|
| 5,436,929 A | 7/1995 | Kawas |
| 5,790,598 A | 8/1998 | Moreland et al. |
| 6,081,566 A | 6/2000 | Molnar et al. |
| 6,151,358 A * | 11/2000 | Lee et al. .................... 375/232 |
| 6,937,644 B2 * | 8/2005 | Pan et al. .................... 375/147 |
| 2006/0105767 A1 * | 5/2006 | Kim ........................... 455/434 |

* cited by examiner

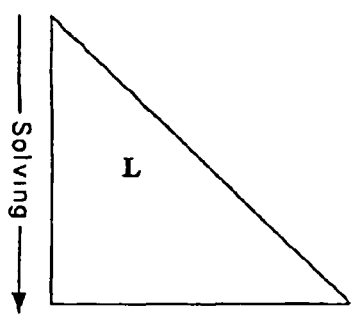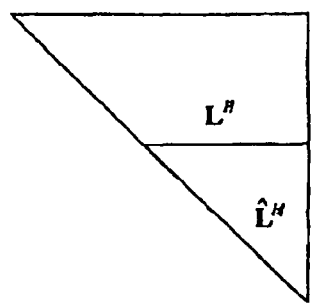
System of Liner equations - Forward
System of Liner equations - Backward
Figure 3
Figure 4

US 7,787,535 B2

METHOD FOR CALCULATING FILTER COEFFICIENTS FOR AN EQUALISER IN A COMMUNICATION RECEIVER USING HERMITIAN OPTIMISATION

BACKGROUND OF THE INVENTION

The present invention relates generally to equalisers in communication receivers.

Most modern communication systems transmit data over time-varying, dispersive communication channels. Among the distortions introduced by the channel, inter-symbol interference (ISI) is significant because it severely degrades the performance of the receiver. To mitigate the effects of ISI, many receivers use equalizers. The general architecture of an equalizer comprises filters, adders for combining the output of the filters, and decision devices. The filters are linear finite-impulse-response (FIR) with complex coefficients. A decision device operates on complex inputs and outputs complex values that are representative of the signal constellation points of the modulation scheme.

In general, the equalizer filter coefficients are jointly optimised according to a criterion suitable for the communication system. Determining the optimal equalizer filter coefficients is a computationally intensive task because it requires the solution to a large set of linear equations. Two general approaches are commonly used today: the first approach is the adaptive approach, and the second is the direct matrix inversion approach.

In the adaptive approach, the equalizer filter coefficients are first set to some initial values. The output error signal, defined as the difference between the input and the output of the equalizer decision device, is then used to recursively adjust the equalizer filter coefficients toward the optimal settings. Depending on the coefficient adaptation algorithm employed, a training sequence may be required. A training sequence is a known set of symbols that the transmitter sends along with the data. In U.S. Pat. No. 5,068,873 issued to Murakami, the least mean square (LMS) or Kalman filter algorithm is used for adaptation. A training sequence is required for that approach. The LMS algorithm requires $O(N)$ complex operations per iteration, where N is the total number of coefficients to optimise. Furthermore, a large number of iterations (>>N) is required for the equalizer filter coefficients to converge to the optimal values. While. Kalman filter algorithm converges faster to the optimal solution, it requires $O(N^2)$ operations per iteration. Similarly, U.S. Pat. No. 5,283, 811 issued to Chennankeshu, et al. employs the fast Kalman algorithm for decision-feedback equalizer (DFE) coefficient adaptation. U.S. Pat. No. 3,974,449 issued to Falconer describes a DFE adaptation method that does not use training sequences.

In the direct matrix inversion approach, a response of the channel to the signalling pulse is first estimated. This estimate is the response, filtered by the receiver filter, of the channel to the transmitter spectral-shaping pulse. The equalizer coefficients are then obtained from the estimate of the response of the channel to the signalling pulse by solving a set of complex-valued linear equations. In general, the solution of these equations requires the inversion of an N times N square matrix, which requires $O(N^3)$ complex multiplications. U.S. Pat. No. 5,436,929 issued to Kawas Kaleh utilizes positive-definite and Hermitian symmetric properties of the square matrix so that a Cholesky decomposition can be used. The Cholesky decomposition requires $O(N^3)$ complex multiplications to factor a positive-definite, Hermitian symmetric matrix into the product of lower and upper triangular matrices. The upper triangular matrix is equal to the Hermitian transpose of the lower triangular matrix. The triangular matrices are easily invertible, requiring $O(N^2)$ multiplications. U.S. Pat. No. 5,790,598 issued to Moreland, et al. describes a recursive method using the Cholesky decomposition. Both of these techniques still require $O(N^3)$ complex multiplications.

Typically, calculation of the vector of filter coefficients is to find the middle row $w_0$ of the matrix $W=[H^H H+\sigma^2 I]^{-1} H^h = G^{-1} H^H$ where G and H are channel response matrices, I is the identity matrix, the superscript H indicates the Hermitian transpose of a matrix and the superscript $-1$ indicates the inverse or reciprocal of a matrix. This means one would have to calculate middle row vector $r_0$ of the inverse channel response matrix $G^{-1}$ and then multiply with the Hermitian transpose $H^H$ of the channel response matrix H to obtain a filter vector $w_0 = r_0 H^H$. If the dimension of the channel response matrix G is N then $O(N^3)$ complex multiplications would be required to calculate the middle row vector $r_0$.

It can therefore be seen that in general, the optimisation of the equalizer coefficients requires at least $O(N^3)$ complex multiplies if direct matrix inversion were to be used. This complexity makes the method impractical to implement in many real life communication system. The complexity may be even greater for the adaptive approach if a large number of iterations required. Moreover, the adaptive approach usually results in sub optimal solution compared to the direct matrix inversion method.

Thus there is a need for an efficient method for computing the equalizer filter coefficients in an equaliser that is practically able to be implemented in a communication receiver. It would be desirable for the method for computing the equalizer filter coefficients to be computationally les complex that currently known methods. It would also be desirable to provide a method for computing the equalizer filter coefficients in an equaliser that ameliorates or overcomes one or more problems of known coefficient calculation methods.

DISCLOSURE OF THE INVENTION

With this in mind, one aspect of the present invention provides a method for computing filter coefficients for an equaliser in a communication receiver, the method including the steps of:

calculating channel response matrices G and H from channel estimation inputs;

performing a Cholesky decomposition of the channel response matrix G into a lower triangular matrix L and an upper triangular matrix U;

performing forward substitution on the lower triangular matrix L to calculate a column vector d;

performing backward substitution on the column vector d and the Hermitian transpose $L^H$ of the lower triangular matrix L to calculate a middle column $c_0$ of the inverse $G^{-1}$ of the channel response matrix G; and calculating the filter coefficients from the middle column $c_0$ of the inverse channel response matrix $G^{-1}$ and the Hermitian transpose $H^H$ of the channel response matrix H.

Such a method takes advantage of the fact that the inverse channel response matrix $G^{-1}$ is also Hermitian as the channel response matrix G. Therefore, instead of having to fully calculate the inverse channel response matrix $G^{-1}$ and then obtain the middle row $r_0$ of the inverse channel response matrix $G^{-1}$, only middle column $c_0$ of the inverse channel response matrix $G^{-1}$ is calculated to obtain the vector $w_0$ of filter coefficients according to $w_0 = c_0^H H^H$. The calculation of the middle column $c_0$ is shown below to require only $O(N^2)$ complex multiplications.

Preferably, only half of the elements of the middle column $c_0$ of the inverse channel response matrix $G^{-1}$ are calculated during backward substitution.

Since it is observed that the middle column $c_0$ of the inverse channel response matrix $G^{-1}$ itself is Hermitian symmetrical, only half of its elements need to be calculated so that computation can be further reduced.

Another aspect of the invention provides an equaliser for use in a communication receiver, the equaliser includes data processing means for carrying out the above-described coefficient calculation method.

The following description refers in more detail to the various features of the invention. To facilitate an understanding of the invention, reference is made in the description to the accompanying drawings where the equaliser and method of calculating filter coefficients for an equaliser is illustrated is a preferred embodiment. It is to be understood that the invention is not limited to the preferred embodiment as illustrated in the drawings.

BRIEF DESCRIPTION OF DRAWINGS

FIGS. 3 and 4 are graphical representations respectively of the forward and backward substitution steps of the filter coefficient calculation method carried out by the equaliser of FIG. 2.

DESCRIPTION OF THE PREFERRED EMBODIMENTS

Figure 1:
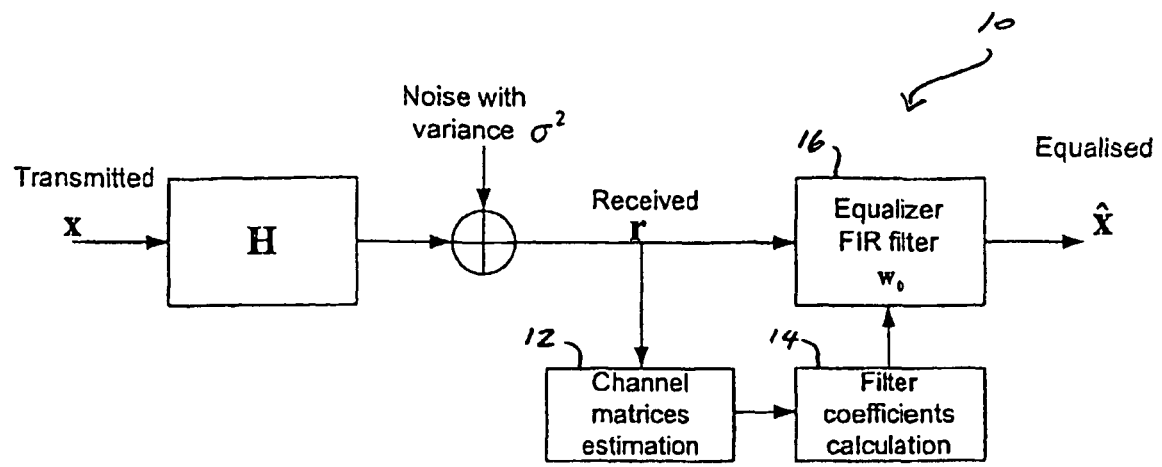
FIG. 1 is a schematic diagram of a known equaliser used in a communication system.

Referring now to FIG. 1, there is shown generally a generic equalizer device 10 used in a communication system. The equaliser 10 is designed to restore the transmitted signal distorted by dispersive channel (characterised by channel response matrix H) and noise (characterised by variance $\sigma^2$). In order to calculate filter coefficients for the equaliser, a channel response matrix G is calculated by the equalizer 10 based on estimate of channel response matrix H. This step is commonly performed using pilot signalling. The signal processing is usually done in the equaliser 10 in block by block fashion. A first channel matrices estimation block 12 receives input signals (vector r) for use in estimating channel response matrices H and G. The filter coefficients vectors are then calculated in a filter coefficients calculation block 14 where the calculation involves the inversion of channel response matrix G. The calculated filter coefficient vector $w_0$ is then used to equalise the received vector r by means of an FIR filter 16 to obtained the output data subsequently used in a communication receiver.

In order to understand the computational complexity of the inversion of channel response matrix G, the normal method for matrix inversion will now be described.

Since the channel response matrix G is Hermitian and positive definite, there is unique lower (upper) triangular matrix L(U) such that $G=LL^H=U^HU$, when the superscript H indicates the Hermitian transpose of a matrix. In general, we have $$GG^{-1}=I \Leftrightarrow L(L^HG^{-1})=I \Leftrightarrow LD=I \quad (1)$$

where the superscript −1 indicates the inverse of a matrix and I is the identity matrix. Moreover, we also have $$L^HG^{-1}=D \quad (2)$$

To find the inverse channel response matrix $G^{-1}$, the following steps need to be carried out:

Step 1: Perform a Cholesky decomposition of the channel response matrix to obtain the lower triangular matrix L—calculation complexity $O(N^3)$ Step 2: Solve equation(1) to obtain matrix D using Forward Substitution as the lower triangular matrix L.

Step 3: Solve equation (2) to get the inverse channel response matrix $G^{-1}$ using Backward Substitution on the matrices D and $L^H$.

Since the system of linear equations has N times N unknowns (the matrices D and $G^{-1}$ are N by N matrices), Steps 2 & 3 in the above-described method has a calculation complexity of $O(N^3)$.

This high level of computational complexity is usually a prohibitive factor for this generic device to be used in practical communication system.

Figure 2:
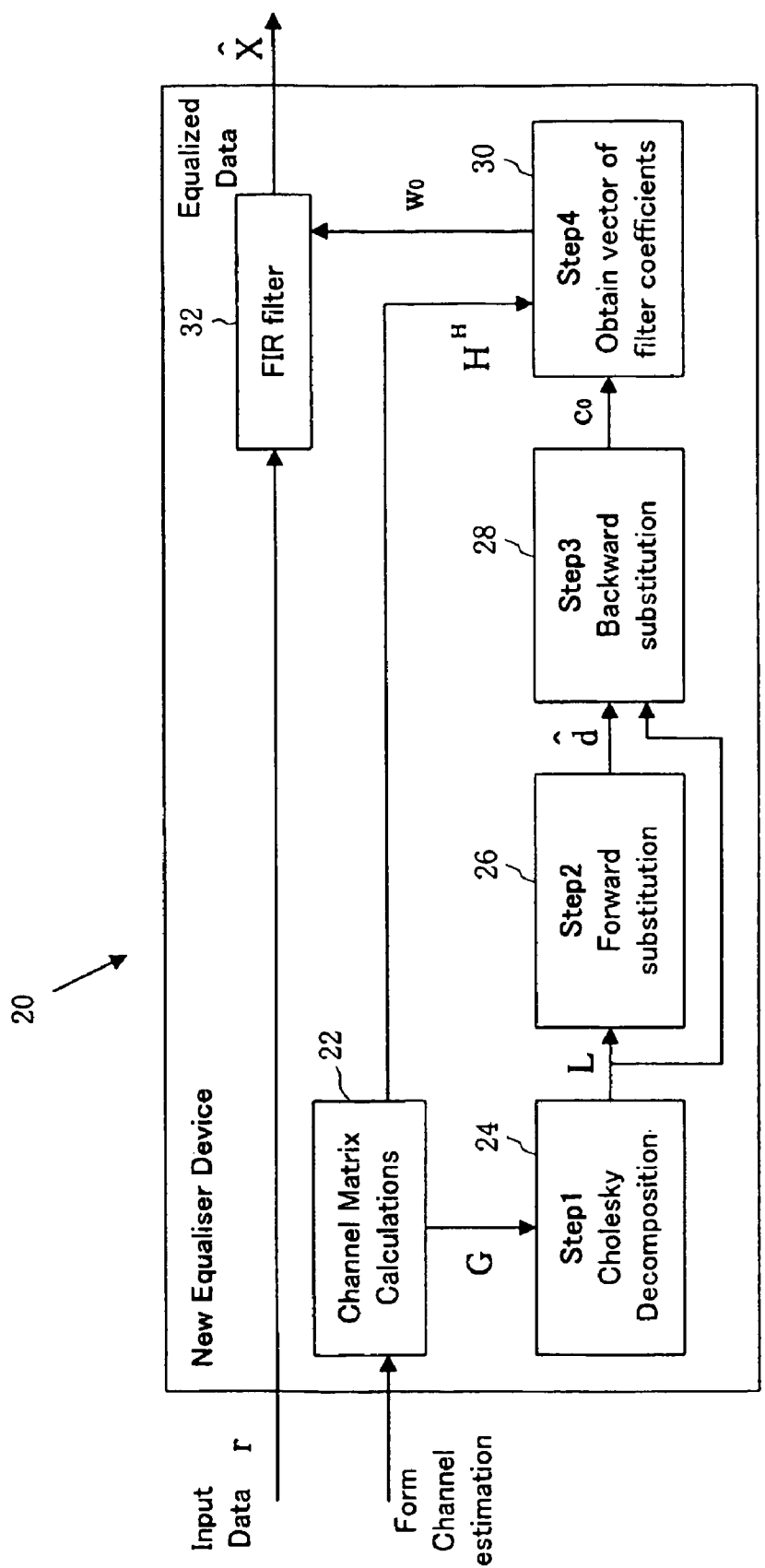
FIG. 2 is a schematic diagram of an equaliser according to the present invention and depicts generally the steps performed by the equaliser in calculating the filter coefficients used by the equaliser.

A new equalizer is illustrated in FIG. 2. The equaliser 20 has significantly reduced computational complexity for Step 2 and Step 3 from $O(N^3)$ to $O(N^2)$ and thus become suitable for use in a practical communication system.

The equaliser 20 contains the following principal function blocks:

1. A channel matrix calculation block 22 for calculation of channel response matrices H and G based on channel estimation input,
2. A Cholesky decomposition block 24 to perform a Cholesky decomposition of the channel response matrix G into a lower triangular matrix L and an upper triangular matrix U.
3. A forward substitution block 26. This block performs computations to solve the system of equation $$Ld = e_{(N+1)/2} = [e_1, e_2, \ldots, e_N]^T \quad (3)$$

where $$e_i = \begin{cases} 1 & i = (N+1)/2 \\ 0 & \text{otherwise} \end{cases}$$

to obtain a column vector d. Preferably, only half of this vector (denoted as $\hat{d}$ where $\hat{d}=d[(N-1)/2,\ldots,N-1]$) needs to be inputted into the next block. FIG. 3 is a graphical illustration of the forward substitution step performed by this block.

4. A backward substitution block 28. This block solves the system of equation $$\hat{L}^H \hat{c}_0 = \hat{d}$$

where $$\hat{L}^H[i,j]=L^H[i+(N-1)/2,j+(N-1)/2] \forall 0 \leq i,j \leq (N-1)/2 \quad (4)$$

to get half of vector $c_0$ (denoted as $\hat{c}_0$). FIG. 4 is a graphical illustration of the backward substitution step performed by this block. The full vector $c_0$ can then be obtained noting that $$c_0[(N-1)/2+k]=\hat{c}_0[k], c_0[k]=c_0[N-1-k]^*, k=0,\ldots, (N-1)/2 \quad (5)$$

5. A filter coefficients calculation block 30 for obtaining a vector $w_0$ of filter coefficients. This block performs calculations to obtain $w_0=c_0^H H^H$ The vector $w_0$ of filter coefficients is then applied to the FIR filter 32 to filter the input data r. The vector $w_0$ of filter coefficients is updated from time to time.

Since the system of linear equations (3) and (4) has N and (N+1)/2 unknowns, solving them only requires calculation complexity of $O(N^2)$. This significantly reduced computational complexity that enables the use of the invented device in practical communication.

It will be appreciated from the foregoing that in a communication system, calculating the filter coefficients for an equalizer at the receiver using direct matrix inversion would normally require up to $O(N^3)$ complex multiplications for forward & backward substitutions processing, where N is dimension of the square channel matrix to be inverted. This high level of computational complexity is a prohibitive factor for this method to be used in practical communication device. The above-described equaliser uses an efficient method of calculation requiring only $O(N^2)$ complex multiplications for forward & backward substitutions processing to obtain exactly the same performance as normal equalizer employing direct matrix inversion. The simplified calculation is achievable by exploiting the special property (Hermitian and Positive Definite) of the channel response matrix G as well as the way filter coefficients are calculated in a particular realisation of the equalizer receiver.

Finally, it should be appreciated that modifications and/or additions may be made to the equaliser and method of calculating filter coefficients for an equaliser without departing from the spirit or ambit of the present invention described herein.

The invention claimed is:

1. A method for computing filter coefficients for an equaliser in a communication receiver, the method including the steps of:
    calculating channel response matrices G and H from channel estimation inputs;
    performing a Cholesky decomposition of the channel response matrix G into a lower triangular matrix L and an upper triangular matrix U;
    performing forward substitution on the lower triangular matrix L to calculate a column vector d;
    performing backward substitution on the column vector d and a Hermitian transpose $L^H$ of the lower triangular matrix L to calculate a middle column $c_0$ of an inverse $G^{-1}$ of the channel response matrix G; and
    calculating the filter coefficients from the middle column $c_0$ of the inverse channel response matrix $G^{-1}$ and a Hermitian transpose $H^H$ of the channel response matrix H.

2. A method according to claim 1, wherein a vector $\hat{c}_0$ of only half of the elements of the middle column $c_0$ of the inverse channel response matrix $G^{-1}$ are calculated during the backward substitution step.

3. A method according to claim 2, wherein the step of calculating the filter coefficients includes the step of obtaining the filter middle column $c_0$ from the vector $\hat{c}_0$.

4. A method according to any one of the preceding claims, wherein the forward substitution step includes performing computations to solve the system of equation $$Ld = e_{(N+1)/2} = [e_1, e_2, \ldots, e_N]^T$$

where $$e_i = \begin{cases} 1 & i = (N+1)/2 \\ 0 & \text{otherwise} \end{cases}$$

to obtain the column vector d.

5. A method according to claim 3, wherein the backward substitution step includes performing computations to solve the system of equation $$\hat{L}^H \hat{c}_0 = \hat{d}$$

where $$\hat{L}^H[i,j] = L^H[i+(N-1)/2, j+(N-1)/2] \forall 0 \leq i, j \leq (N-1)/2 \quad (4)$$

where $\hat{c}_0$ is half of the middle column $c_0$ of the inverse channel response matrix $G^{-1}$, and $\hat{d}=d[(N-1)/2, \ldots, N-1]$.

6. A method according to claim 5, wherein the middle column $c_0$ is obtained from the vector $\hat{c}_0$ by performing computations to solve the equation $$c_0[(N-1)/2+k] = \hat{c}_0[k], \; c_0[k] = c_0[N-1-k]^*, \; k=0, \ldots, (N-1)/2.$$

7. An equaliser for use in a communications device, the equaliser including:
    one or more processing blocks for carrying out a method for calculating filter coefficients according to claim 1; and
    a filter for using the calculated filter coefficients to equalise input signals received by the equaliser.

* * * * *